(12) United States Patent
Little et al.

(10) Patent No.: US 6,181,316 B1
(45) Date of Patent: Jan. 30, 2001

(54) GRAPHICAL USER INTERFACE INLINE SCROLL CONTROL

(75) Inventors: Alex Dudley Little, Raleigh, NC (US); Anthony Edward Martinez, Austin, TX (US)

(73) Assignee: International Business Machines Corporation, Armonk, NY (US)

( * ) Notice: Under 35 U.S.C. 154(b), the term of this patent shall be extended for 0 days.

(21) Appl. No.: 09/090,687

(22) Filed: Jun. 4, 1998

(51) Int. Cl.[7] .................................. G06F 3/00; G09G 5/34
(52) U.S. Cl. .......................... 345/123; 345/125; 345/326; 345/341; 345/973
(58) Field of Search ...................... 345/341, 342, 345/123, 125, 352–354, 146, 356–357, 121, 973–974, 112, 124; 395/973

(56) References Cited

U.S. PATENT DOCUMENTS

| | | | | |
|---|---|---|---|---|
| 4,831,556 | * | 5/1989 | Oono ................................. | 364/521 |
| 5,054,774 | * | 10/1991 | Belsito ............................... | 272/130 |
| 5,204,947 | * | 4/1993 | Bernstein et al. ................. | 395/157 |
| 5,655,094 | * | 8/1997 | Cline et al. ....................... | 395/341 |
| 5,673,401 | * | 9/1997 | Volk et al. ........................ | 395/327 |

OTHER PUBLICATIONS

First Mouse+ Data Sheet from Logitech, Inc.; Copyright 1997 [retrieved on Sep. 7, 1999]. Retrieved from the Internet:<URL: http://www.logitech.com/us/mice/mc13_125.html>, 2 sheets.*

First Mouse+ Review by NewWorld.com, Inc.; Published Jan. 11, 1998 [retrieved on Sep. 7, 1999]. Retrieved from the Internet:<URL: http://www.avault.com/hardware/first-mouseplus.asp> and <URL: http://www.avault.com/hardware/firstmouseplus–b.asp>, 3 sheets.*

* cited by examiner

Primary Examiner—Mark R. Powell
Assistant Examiner—G. F. Cunningham
(74) Attorney, Agent, or Firm—Jeanine S. Ray-Yarletts; Timothy J. O'Sullivan

(57) ABSTRACT

A method and apparatus for inline scrolling of related objects in a computer desktop environment. This scrolling is accomplished by utilizing a pointing device to activate an indicator actually imbedded into the relational information for the data being presented. The inline scrolling is designed to reduce the amount of space required on a display device to convey information to the user.

20 Claims, 11 Drawing Sheets

GRAPHICAL USER INTERFACE INLINE SCROLL CONTROL

BACKGROUND OF THE INVENTION

The growth in acceptance of computers has resulted in increased numbers on non-programmers using computers every day. Computers are a part of life in the workplace, in the schools and in the homes and the reduced experience levels of computer users has imposed a requirement for enhanced user interfaces. Graphical user interfaces are designed to make human interactions with computers more intuitive. They convey information to users by way of a monitor or display device by various combinations of graphical items. Examples of graphical user interfaces (or GUIs) are those provided with operating systems such as IBM's OS/2®[1] and Microsoft's Windows 95®[2]. These operating systems rely on a 'window-based' workspace for displaying application programs, operating system information and program groupings.

[1]OS/2 is a registered trademark of International Business Machines Corporation.
[2]Windows 95 is a registered trademark of Microsoft Corporation.

Current window-based workspaces utilize vertical scroll controls having a sliding scroll control tab to move the contents of a window into view as is shown in FIG. 1. FIG. 1 depicts a window 101 containing a list of related items having three tiers 103 utilizing the currently known window based workspace scroll controls. On the right hand side of the window 101 is a sliding scroll control 111 having an up arrow 113 which can be selected to scroll the related information upward, a down arrow 115 which can be selected to scroll the related information downward, and a bar 117 which indicates the proportion of the information currently displayed on the screen and allows the user to select the bar 117 and drag it for expedited traversal of the related information. This sliding scroll control tab adds to the overall visual clutter of the desktop and, with present implementations, consumes a fixed amount of space and remains on screen throughout the existence of the window. An additional disadvantage of the sliding scroll control tab is that its operation requires frequent pointer repositioning. It also requires a separate window frame for the scrolling mechanisms and these mechanisms (the up and down controls and the scroll slider) are physically separate such that significant movement of the pointer is required to fine-tune a scroll operation.

SUMMARY AND OBJECTS OF THE INVENTION

It is an object of the present invention to create an inline method of scrolling through associated elements.

It is a further object that this inline scroll control be minimally invasive and utilize minimal screen space.

It is a further object of the present invention to provide continuous feedback to the user of the progress of the traversal through the related objects.

It is yet a further object of the present invention to reduce the required pointer movement so that use on a notebook computer using pointers such as a track point become easier.

These and other objects of the present invention are provided by the inline scroll control described herein. The inline scroll control provides a method, apparatus and program product for incorporating scroll control directly into a list of related objects such as desktop folders or directories. It does not rely on the window-based paradigm of prior scrolling methods and provides less clutter on the desktop for the user of the GUI.

DETAILED DESCRIPTION OF THE PREFERRED EMBODIMENT

The present invention will now be described in more detail with reference to the accompanying drawings in which preferred embodiments of the invention are shown. Like numbers in different figures represent the same item. It will be obvious to one skilled in the art that the present invention may be embodied in many different forms and should not be construed as limited to the embodiments set forth herein. These embodiments are provided as examples to demonstrate to the reader the present invention.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, magnetic storage devices, or computer memory.

Figure 6B:
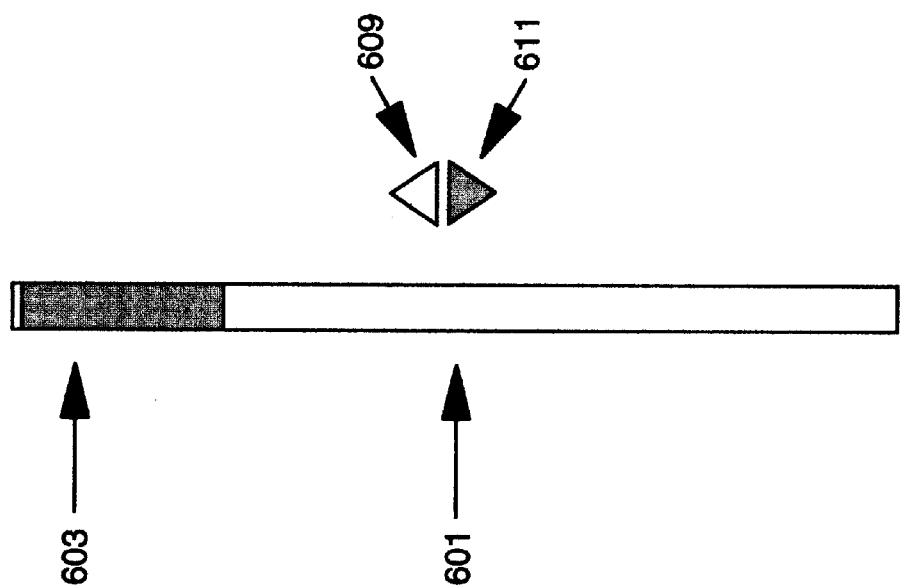
FIG. 6b is an example of a scroll bar indicator for movement in the downward direction only.
Figure 6A:
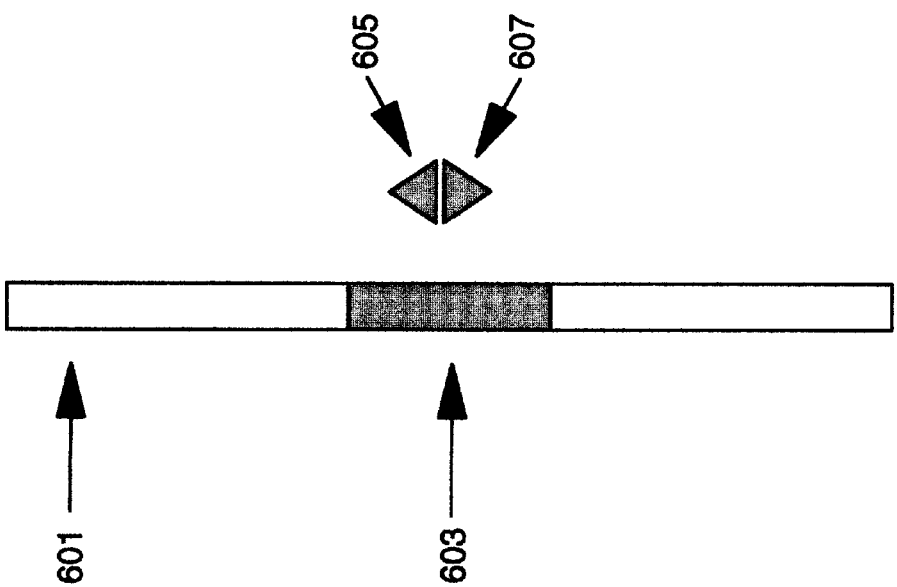
FIG. 6a is an example of a scroll bar indicator for movement in both directions.

FIGS. 6a and 6b show the basic elements in the present invention. FIG. 6a shows an up arrow 605 and a down arrow 607 in addition to a scroll status bar 601 containing a scroll status indicator 603 which indicates that the information is scrolled approximately half way between the top and the bottom. The dark shading in both the up arrow 605 and the down arrow 607 indicates that there is room to scroll in both directions. The scroll status bar 601 can also be used as a fastpath to moving to specific locations within the data by selecting the indicator 603 within the bar and moving it to a desired location within the scroll status bar 601. FIG. 6b shows an example where the scroll status indicator 603 is at the top of the scroll status bar 601 therefore scrolling is only available in the downward direction. This is also indicated to the user by the greying of the upward arrow 609.

Figure 7:
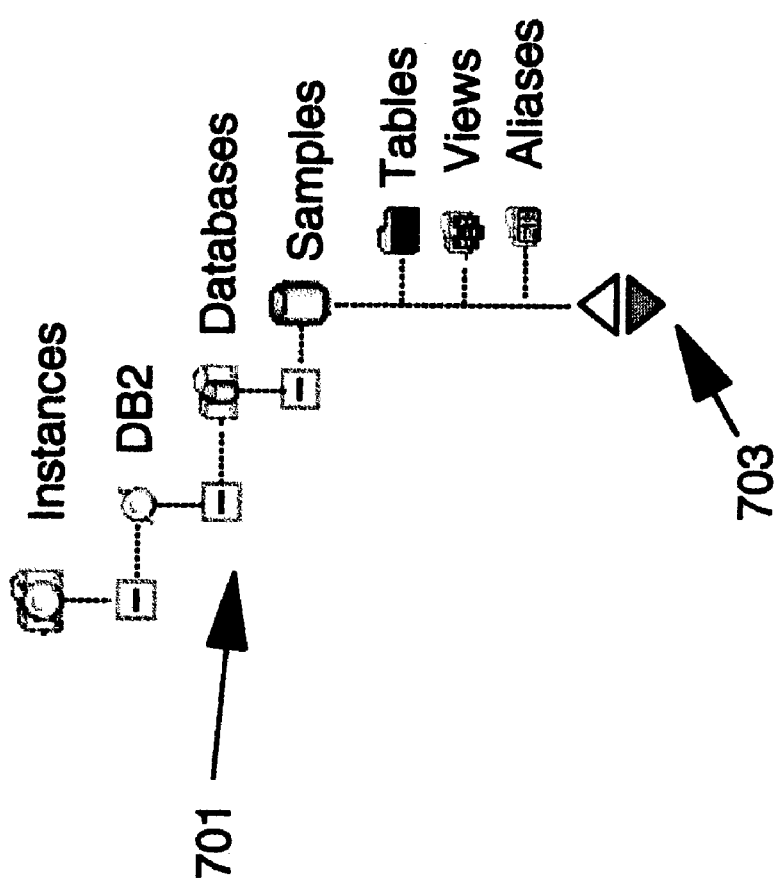
FIG. 7 is another example of the indicator of the present invention.

Referring to FIG. 7, the minimalist inline scroll control does not rely on the window paradigm. It is equally beneficial to an open desktop type of paradigm. The scroll control of the present invention is incorporated directly into the list of related objects (in the preferred embodiment this is a tree structure). FIG. 7 depicts a list of related items 701, in this case a directory of a database, connected together as before with a dashed line. The scroll control 703 is superimposed on the dashed line so that the user can, by placing their pointing device on the scroll control and depressing a predefined button, scroll the list of related items in a given direction. The scroll control indicates that the top of the list is currently displayed (by having the upward arrow greyed) and there is room for scrolling in the downward direction.

Figure 5:
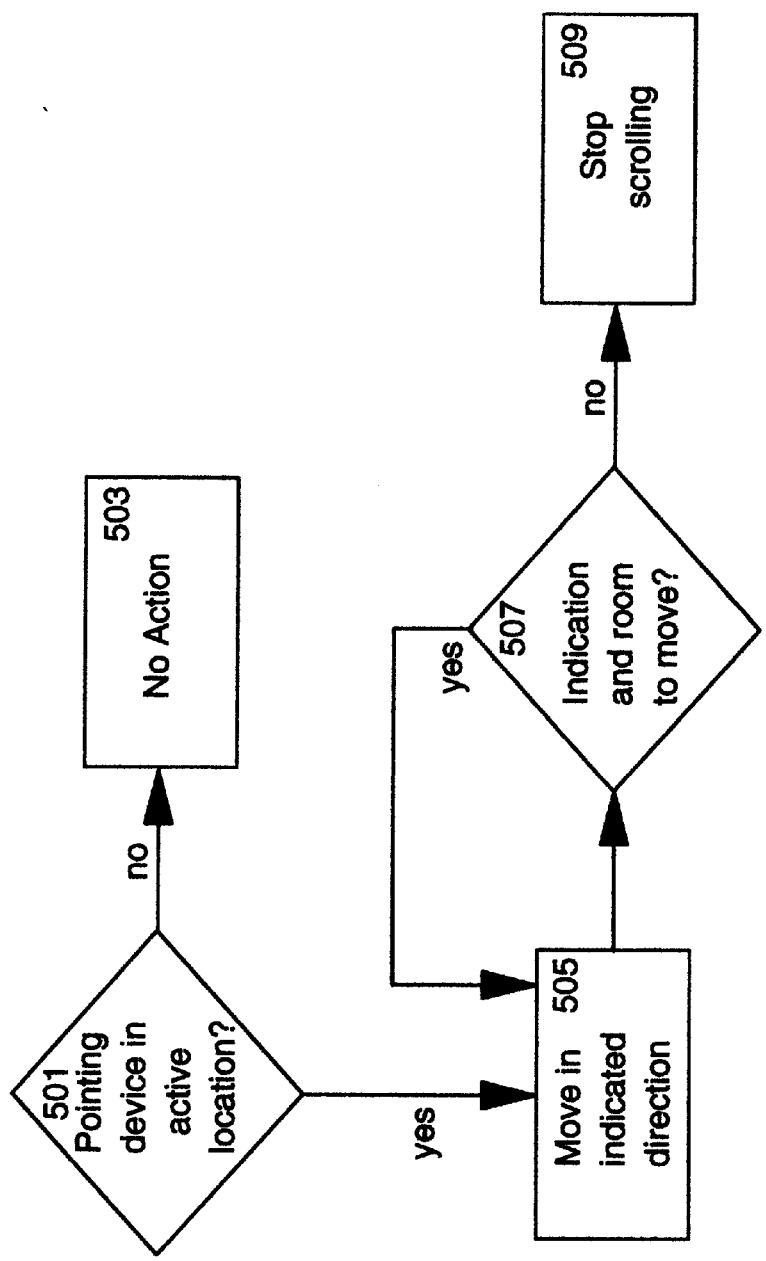
FIG. 5 is a flow chart depicting logic for indicating a control arrow using a pointing device.

FIG. 5 shows a flow chart of the logic invoked when indicating a control arrow using the pointing device. First a check is made to determine if the pointing device is placed over a location which is active 501. If not, no action is taken 503. If the pointing device is over an active location for scroll control, the list in then moved in the indicated direction 505. Checking is continued to determine if the pointing device is still activated, still over an active location and that there is still room to scroll in the indicated direction 507, if so, scrolling is continued 505 otherwise the scrolling is stopped 509.

Figure 8:
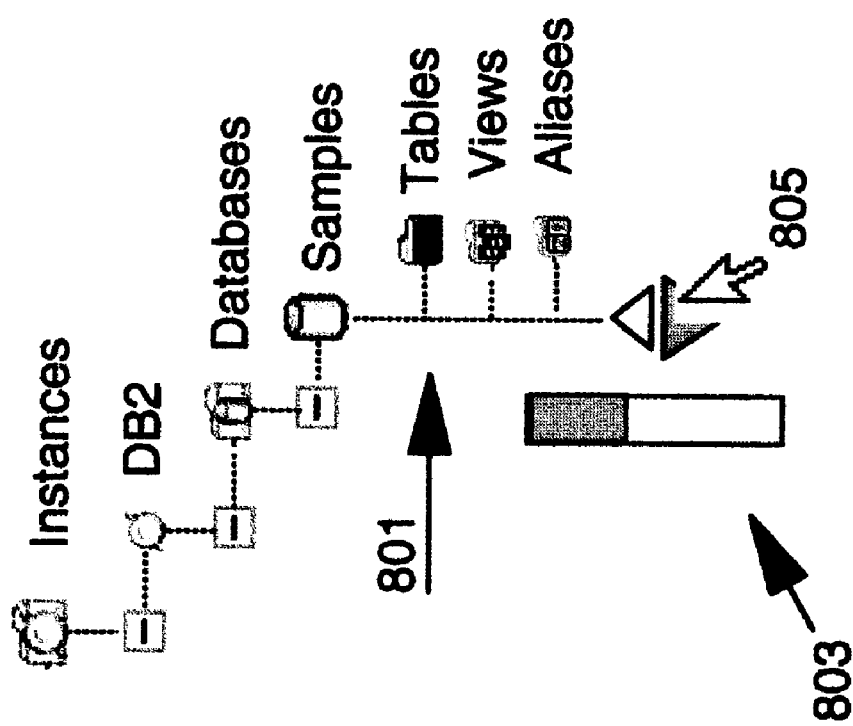
FIG. 8 is an example of the indicator of the present invention with significant room for downward scrolling and a status bar indication.

FIG. 8 provides additional information to the user in that the size of the scroll indicator 805 (the arrow) is proportional to the amount of information not yet displayed in the indicated direction. The arrow in FIG. 7 703 is much smaller than the arrow in FIG. 8 805 thereby indicating that there is more information yet to be displayed in the downward direction of the list of FIG. 8 than in the list of FIG. 7. An additional enhancement is displayed in the status indicator 803 of FIG. 8 in that the status indicator depicts, proportionally, how much of the information is actually visible on the screen. The status indicator could also be used as a fastpath to the top or the bottom of the data should an implementor of the invention chose to trade additional screen clutter for this fastpath functionality, although the designers of the preferred embodiment have placed greater improtance on reducing screen clutter. While the preferred embodiment of the present invention depicts one use of the size of the arrow, there are several alternatives for using the size of the arrow contemplated by the inventors. These uses include, but are not limited to:

1) Indicating proportionally how much of the information is yet to be displayed in the indicated direction; and,
2) Exploding the active arrow as the pointing device approaches it so that it is easier to select using the pointing device.

Figure 9:
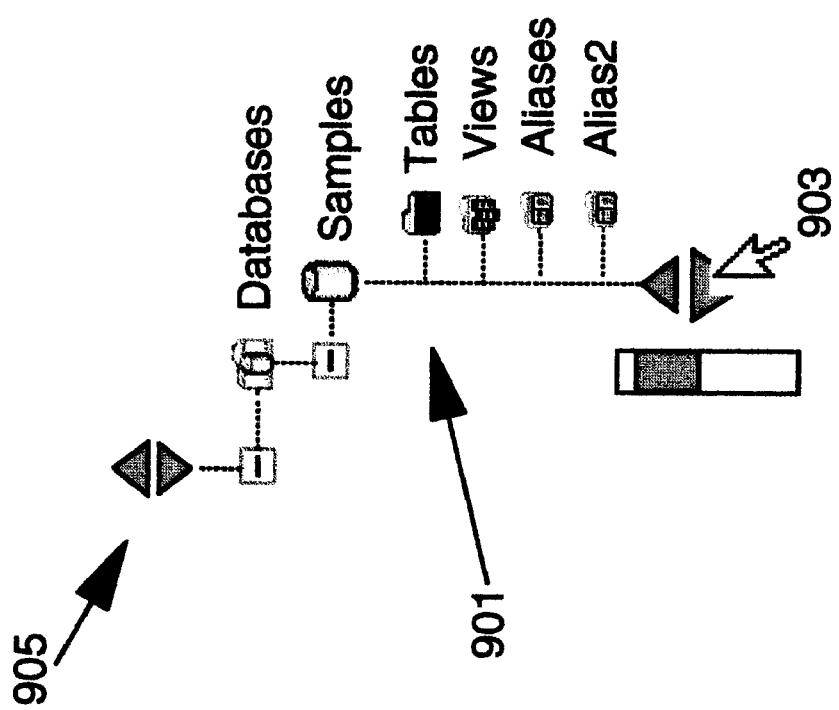
FIG. 9 is an example of the inline scroll control of the present invention demonstrating multidirectional scrolling capabilities using the proportional directional arrows.

FIG. 9 depicts further enhancements to the present invention in that FIG. 9 shows a bidirectional arrow at the top 905 indicating that there is additional information available in both the upward and downward directions, and that arrow can be used to scroll in the upward direction (away from the dashed line). The bidirectional arrow at the bottom 903 of FIG. 9 indicates that there is information available in both the upward and downward directions. The arrow at the bottom 903 can be used to scroll in the downward direction.

Figure 1:
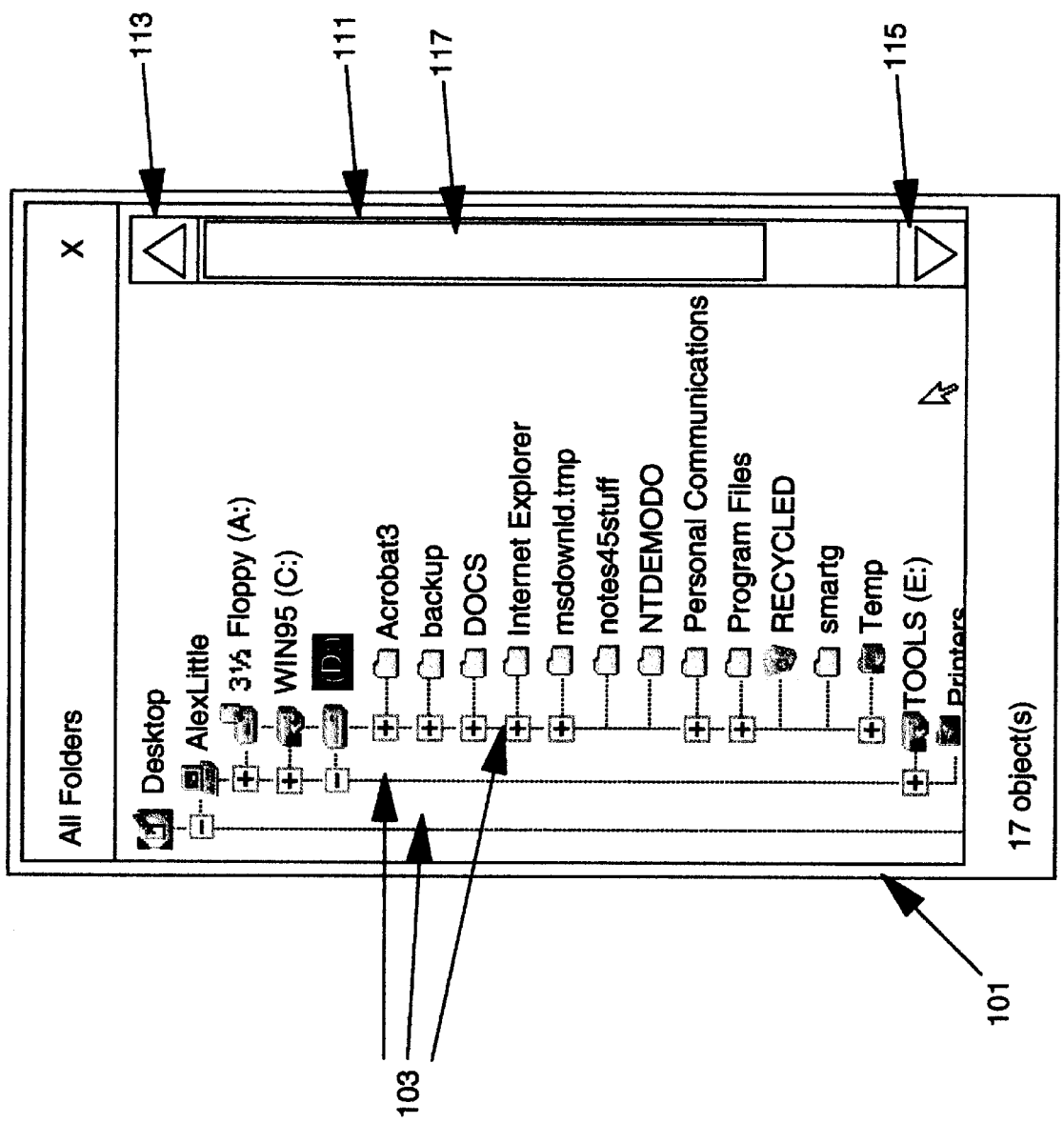
FIG. 1 is an example of a traditional window sliding scroll control (Prior Art).
Figure 2:
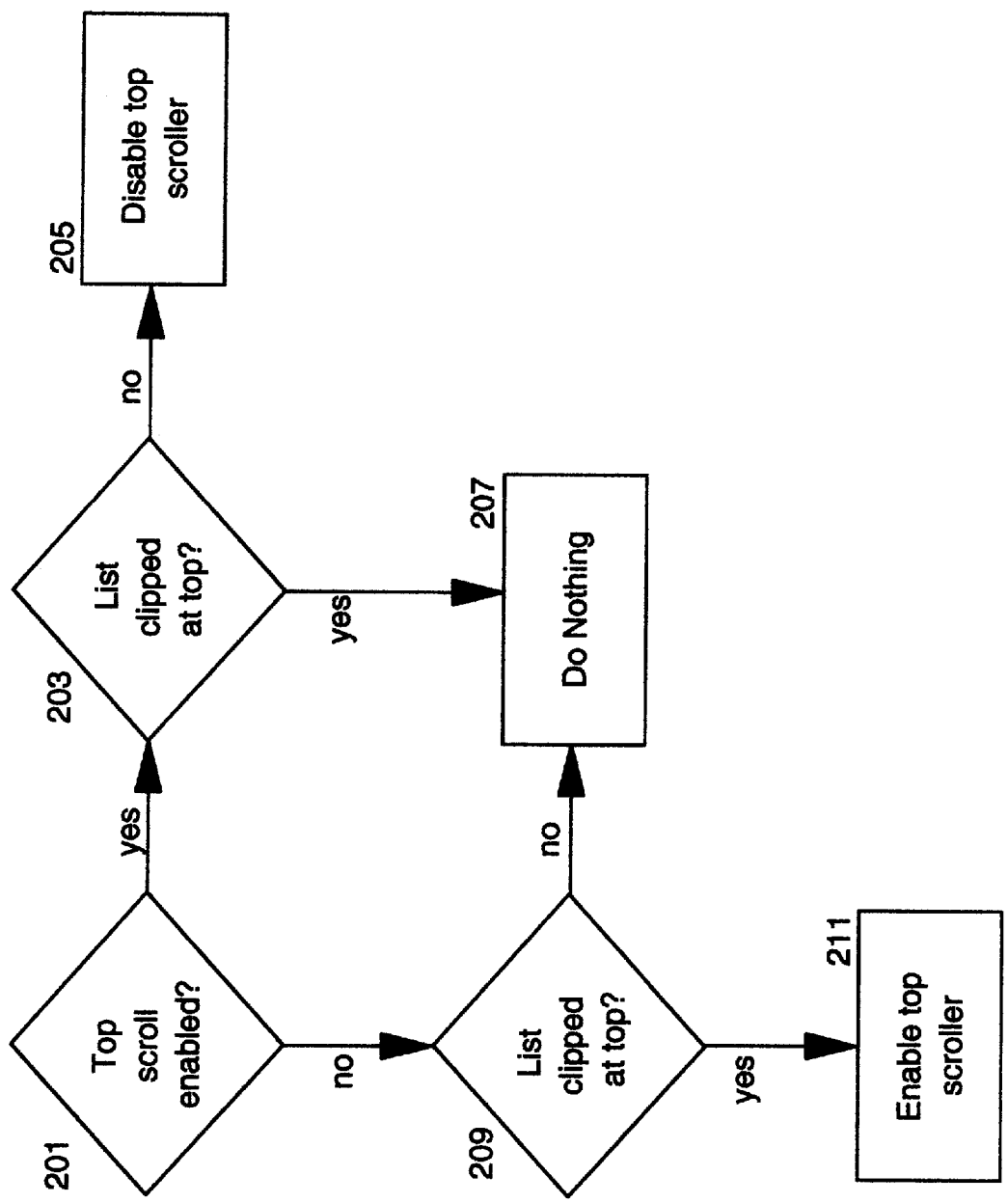
FIG. 2 is a flow chart of the logic for a bottom scrolling indicator.
Figure 3:
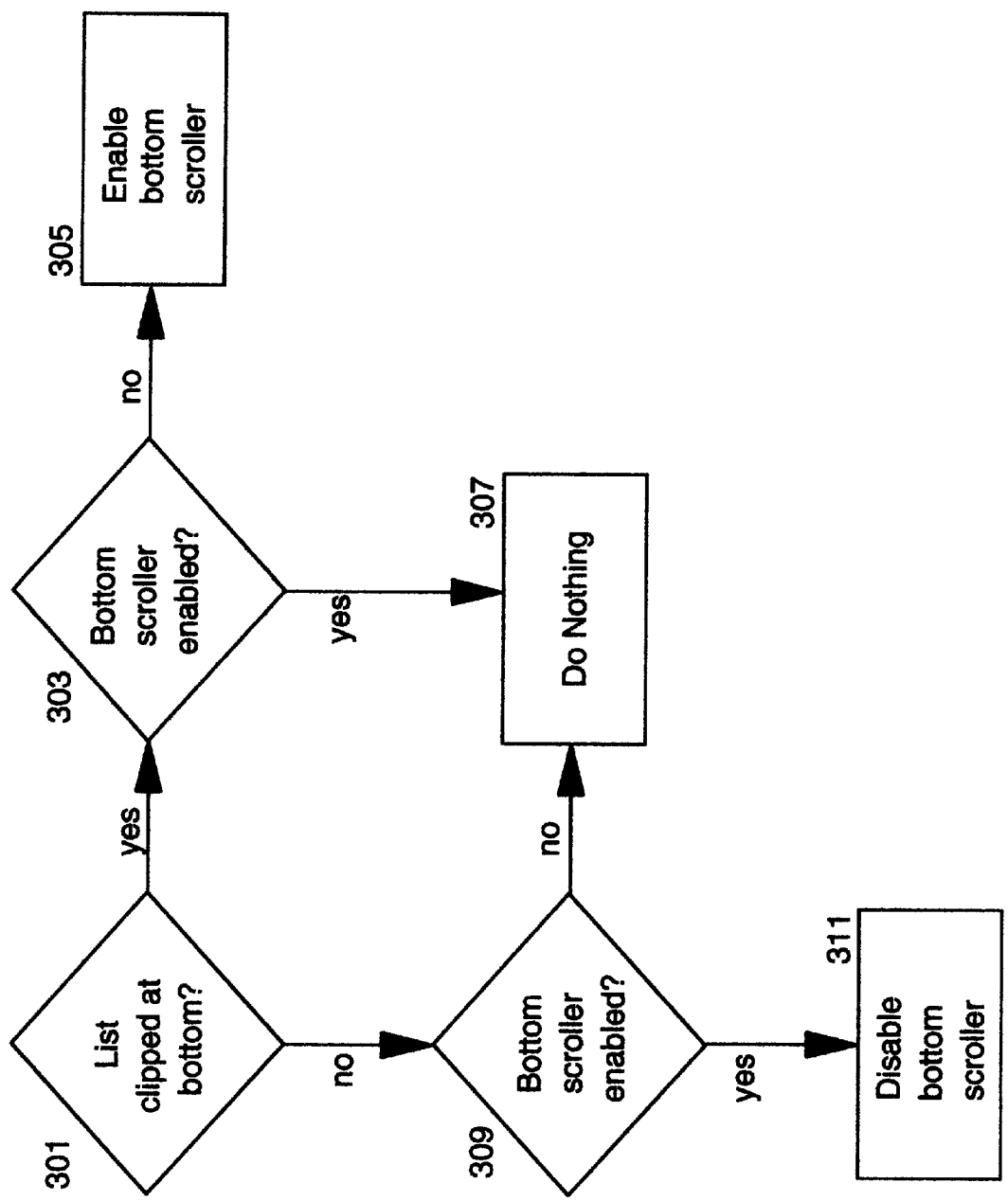
FIG. 3 is a flow chart of the logic for a top scrolling indicator.

FIG. 2 depicts the logic of when to display the top scroll indicator and FIG. 3 depicts the logic of when to display the bottom scroll indicator. Both are very similar. In FIG. 2, first a check is made to determine if the top scroll is enabled 201 for the indicated list. If it is then a check is made to determine if the list is clipped at the top 203 which would indicate that there was room for scrolling in the upward direction and that an indicator should be activated at the top of the list. If the list is to be clipped at the top, since the top scroll is already enabled, then no further action is necessary 207. If the list was not clipped at the top 203, then the top scroller is disabled 205 since it had previously been enabled. If the top scroll was not enabled already 201 and the list was clipped at the top 209 then the top scroll indicator must be enabled 211; otherwise, if the list is not clipped at the top 209 no further action is necessary at this time 207 since the scroll indicator does not need to be displayed at this time.

FIG. 3 is a flow chart similar to that of FIG. 2 for a bottom scroll bar. First a check is made to determine if the indicated list is clipped at the bottom 301. If the list is clipped at the bottom, then a check is made to determine if the bottom scroller is already enabled 303. If the bottom scroller is already enabled, then no action is taken 307, otherwise the bottom scroller is enabled 305. If, at 301, the list was no longer clipped at the bottom (e.g. the bottom of the list had been reached) then a check is made to determine whether the bottom scroller is enabled 309. If the bottom scroller is enabled then it is disabled 311, otherwise no action is taken 307.

Figure 10A:
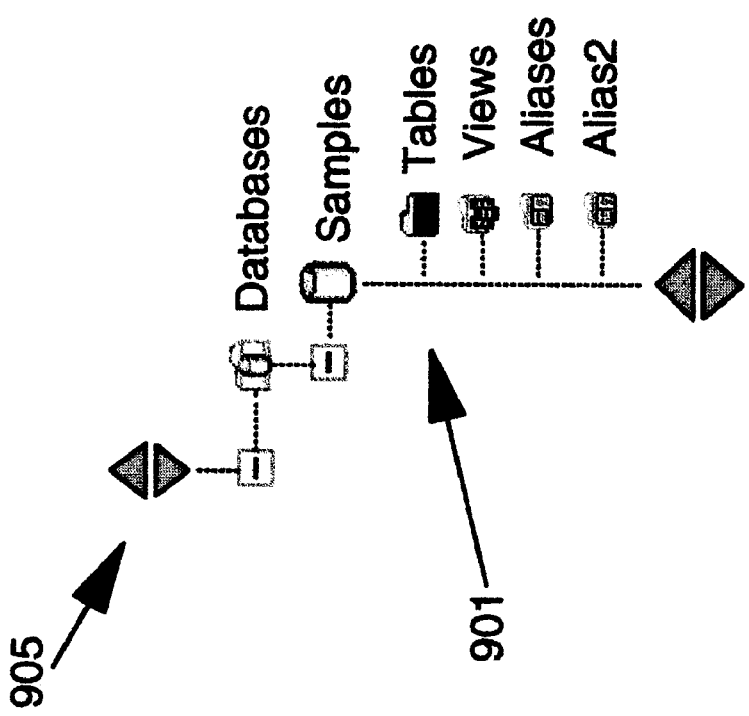
FIG. 10a is another example inline scroll control of the present invention.
Figure 10C:
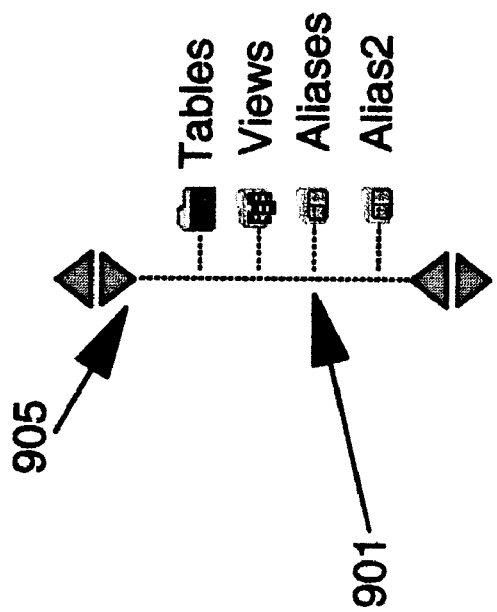
FIG. 10c depicts the control snapping inline once the control is released.
Figure 10B:
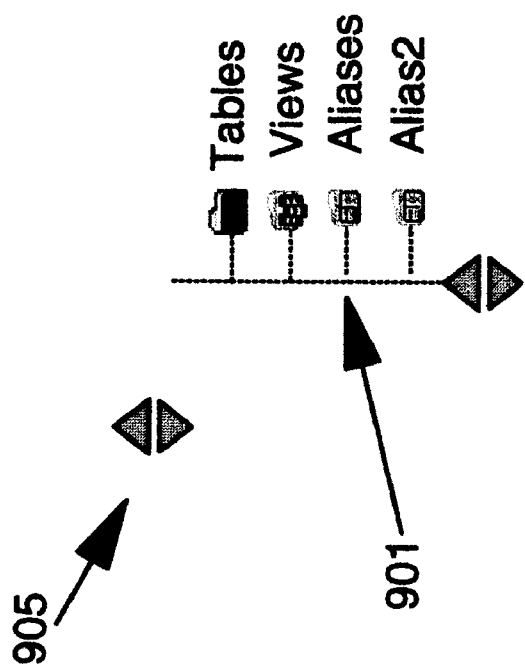
FIG. 10b depicts the stationary aspect of the scroll control as the information is scrolling.

In the preferred embodiment, once a control has been indicated by the pointing device, that control remains in the same space on the screen, even if the branches of the tree upon which the scrolling action is being taken are indenting or moving to the left, until the indication has been released. This is best described by example as shown in FIGS. 10a, 10b and 10c. If a downward indicator is selected such as the down arrow at 905 of FIG. 10a, as the information scrolls downward, the control remains in the same position as shown in FIG. 10b. Once the control is released, it once again becomes "inline" and returns to the information connectors as shown in FIG. 10c.

The scroll indicator of the present invention may be enhanced to have a variable speed scroll such that as the pointer indicator is depressed over the scroll indicator, the acceleration of the scrolling increases.

The present invention, while expanding beyond the window paradigm of most current programs, is closely tied with the data contained within it and relies on relational properties within the data to be presented. Relational properties must exist within the data such as a list structure or a tree structure such that the scrolling can occur in an up and down or left and right manner.

Figure 4:
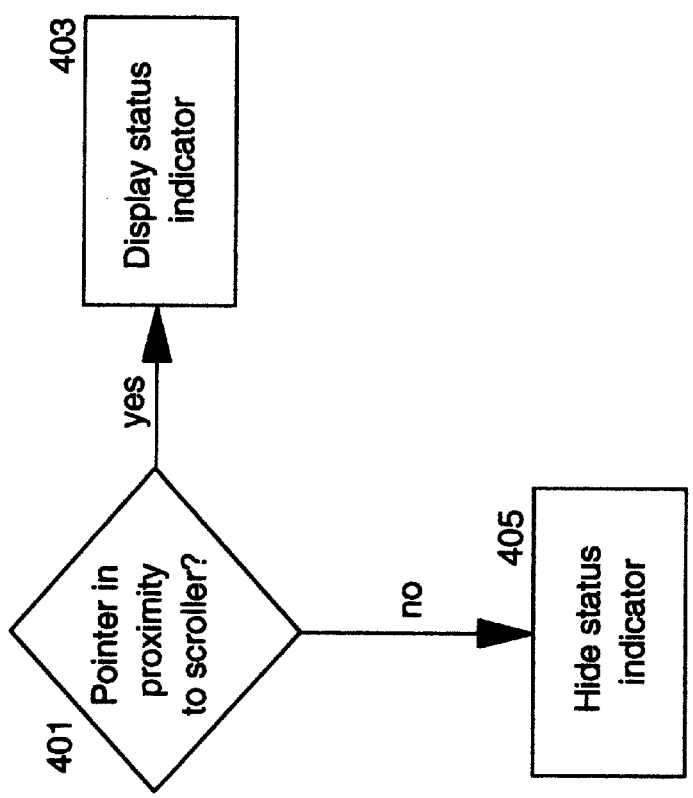
FIG. 4 is a flow chart for cursor detection.

Another possible enhancement of the present invention is indicated by FIG. 4. In order to further reduce clutter on the screen, the status indicator shown as item 601 of FIG. 6a or item 803 of FIG. 8, would only be displayed when the pointer were within a certain proximity to a scroll control. If the pointer were not within the given proximity, then the status indicator would be hidden. To implement this, a check must first be made to determine whether the pointer was within a certain (either predetermined or customizable by the user) proximity to the scroller control 401. If the pointer was within this proximity, then the status indicator is displayed 403, otherwise the status indicator is hidden 405.

What is claimed is:

1. A method for scrolling a display of a collection of entities suitable for display in an ordered manner on a display device, wherein an ordered display of the collection of entities has at least two extreme ends, the method comprising:

displaying a portion of the collection of entities in an ordered sequence;

conditionally displaying a scroll control indicator inline with the display of the portion of the collection of entities and at at least one end of the display of the portion of the collection of entities if the end of the display of the portion of the collection of entities is not an extreme end of the ordered display of the collection of entities;

accepting user input to select the scroll control indicator; and scrolling the displayed portion of the ordered display of the collection of entities upon selection of the scroll control indicator.

2. A method for scrolling a display of a collection of entities suitable for display in an ordered manner on a display device, wherein an ordered display of the collection of entities has at least two extreme ends, the method comprising:

displaying a portion of the collection of entities in an ordered sequence;

conditionally displaying a scroll control indicator inline with the display of the portion of the collection of entities and at at least one end of the display of the portion of the collection of entities if the end of the display of the portion of the collection of entities is not an extreme end of the ordered display of the collection of entities;

accepting user input to select the scroll control indicator; and scrolling the displayed portion of the ordered display of the collection of entities upon selection of the scroll control indicator; and wherein the scroll control indicator indicates a direction in the ordered display of the collection of entities in which entities in the collection of entities remain undisplayed, and wherein the scroll control indicator is sized proportionally to the amount of information remaining undisplayed in the indicated direction.

3. A method as claimed in claim 1 wherein said indicator is a bidirectional indicator displayed inline at one end of the display.

4. A method as in claim 1 further comprising the step of displaying a status bar associated with said indicator.

5. A method as in claim 4 wherein control functions are associated with said status bar.

6. A system for scrolling a display of a collection of entities suitable for display in an ordered manner on a display device, wherein an ordered display of the collection of entities has at least two extreme ends, comprising:

means for displaying a portion of the collection of entities in an ordered sequence;

means for conditionally displaying a scroll control indicator inline with the display of the portion of the collection of entities and at at least one end of the display of the portion of the collection of entities if the end of the display of the portion of the collection of entities is not an extreme end of the ordered display of the collection of entities;

means for accepting user input to select the scroll control indicator; and means for scrolling the displayed portion of the ordered display of the collection of entities upon selection of the scroll control indicator.

7. A system for scrolling a display of a collection of entities suitable for display in an ordered manner on a display device, wherein an ordered display of the collection of entities has at least two extreme ends, comprising:

means for displaying a portion of the collection of entities in an ordered sequence;

means for conditionally displaying a scroll control indicator inline with the display of the portion of the collection of entities and at at least one end of the display of the portion of the collection of entities if the end of the display of the portion of the collection of entities is not an extreme end of the ordered display of the collection of entities;

means for accepting user input to select the scroll control indicator; and means for scrolling the displayed portion of the ordered display of the collection of entities upon selection of the scroll control indicator; and wherein the means for displaying a scroll control indicator comprises means for displaying a scroll control tat indicates a direction in the ordered display of the collection of entities in which entities in the collection of entities remain undisplayed, and wherein the scroll control indicator is sized proportionally to the amount of information remaining undisplayed in the indicated direction.

8. A system as claimed in claim 6 wherein said indicator is a bidirectional indicator displayed inline at one end of the display.

9. A system according to claim 6, further comprising a status bar associated with said indicator.

10. A system as claimed in claim 9 also having control means associated with said status bar.

11. A computer program product for scrolling a display of a collection of entities suitable for display in an ordered manner on a display device, wherein an ordered display of the collection of entities has at least two extreme ends, comprising:

computer readable program code embodied in a computer readable medium, the computer readable program code comprising:

computer readable program code which displays a portion of the collection of entities in an ordered sequence;

computer readable program code which conditionally displays a scroll control indicator inline with the display of the portion of the collection of entities and at at least one end of the display of the portion of the collection of entities if the end of the display of the portion of the collection of entities is not an extreme end of the ordered display of the collection of entities;

computer readable program code which accepts user input to select the scroll control indicator; and computer readable program code which scrolls the displayed portion of the ordered display of the collection of entities upon selection of the scroll control indicator.

12. A computer program product for scrolling a display of a collection of entities suitable for display in an ordered manner on a display device, wherein an ordered display of the collection of entities has at least two extreme ends, comprising:

computer readable program code embodied in a computer readable medium, the computer readable program code comprising:

computer readable program code which displays a portion of the collection of entities in an ordered sequence;

computer readable program code which conditionally displays a scroll control indicator inline with the display of the portion of the collection of entities and at at least one end of the display of the portion of the collection of entities if the end of the display of the portion of the collection of entities is not an extreme end of the ordered display of the collection of entities;

computer readable program code which accepts user input to select the scroll control indicator; and computer readable program code which scrolls the displayed portion of the ordered display of the collection of entities upon selection of the scroll control indicator; and wherein the computer readable program code which displays a scroll control indicator comprises computer readable program code which displays a scroll control that indicates a direction in the ordered display of the collection of entities in which entities in the collection of entities remain undisplayed, and wherein the scroll control indicator is sized proportionally to the amount of information remaining undisplayed in the indicated direction.

13. A computer program product according to claim 11, wherein said indicator is a bidirectional indicator displayed inline at one end of the display.

14. A computer program product according to claim 11, further comprising computer readable program code which displays a status bar associated with said indicator.

15. Computer program code as in claim 14 also having computer program control means associated with said status bar.

16. A graphic user interface for displaying a collection of entities which may be displayed in an ordered sequence on a display device, the graphic user interface comprising:

a display area for displaying a portion of the collection of entities in the ordered sequence; and an inline scroll control conditionally displayed in the display area and at an end of the displayed portion of the collection of entities in the ordered sequence if additional entities in the ordered sequence remain undisplayed, wherein activation of a portion of the inline scroll control causes the portion of the collection of entities displayed in the display area to scroll.

17. A graphic user interface according to claim 16, wherein the inline scroll control comprises two opposing arrowheads indicating the direction of scroll if the arrowheads are selected.

18. A graphic user interface according to claim 17, wherein the inline scroll control further comprises a scroll bar which indicates the relative position in the collection of entities of the portion of the collection of entities displayed in the display area.

19. A graphic user interface for displaying a collection of entities which may be displayed in an ordered sequence on a display device, the graphic user interface comprising:

a display area for displaying a portion of the collection of entities in the ordered sequence; and an inline scroll control displayed in the display area and at an end of the displayed portion of the collection of entities in the ordered sequence, wherein activation of a portion of the inline scroll control causes the portion of the collection of entities displayed in the display area to scroll, wherein the inline scroll control comprises two opposing arrowheads indicating the direction of scroll if the arrowheads are selected and wherein a size of the arrowheads indicates the relative amount of the collection of entities which are undisplayed in the direction of scroll associated with the arrowhead.

20. A graphic user interface according to claim 16, where in an inline scroll control is displayed in the display area at both ends of the displayed portion of the collection of items.

* * * * *